(No Model.)
A. & F. T. McGOWEN.
COTTON OR HAY PRESS.
No. 362,299. Patented May 3, 1887.
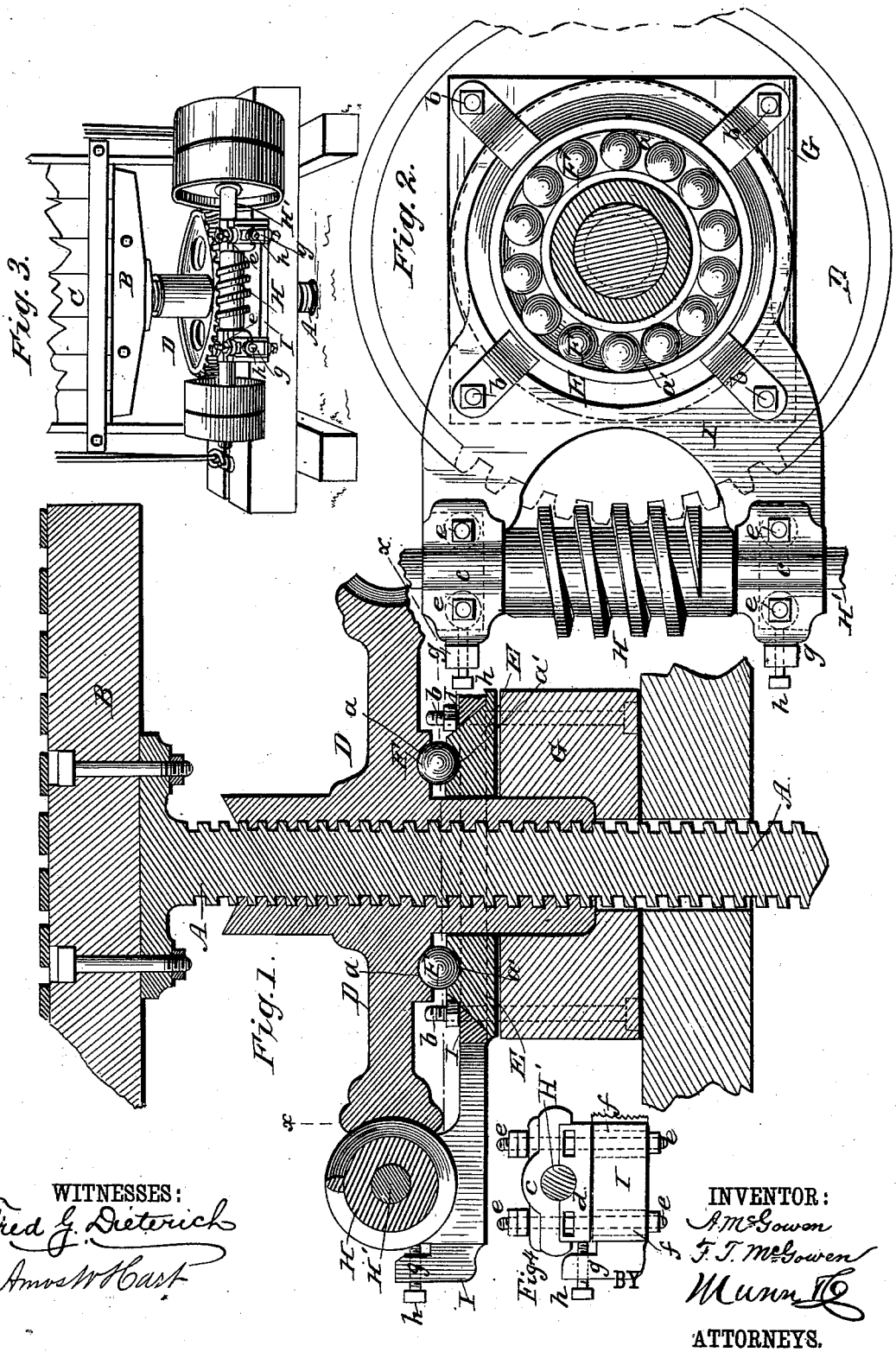
WITNESSES:
Fred G. Dieterich
Amos W. Hart
INVENTOR:
A. McGowen
F. T. McGowen
BY
Munn & Co
ATTORNEYS.

UNITED STATES PATENT OFFICE.

ALLEXANDER McGOWEN AND FRANK T. McGOWEN, OF HOUSTON, TEXAS.

COTTON OR HAY PRESS.

SPECIFICATION forming part of Letters Patent No. 362,299, dated May 3, 1887.

Application filed November 5, 1886. Serial No. 218,104. (No model.)

*To all whom it may concern:*

Be it known that we, ALLEXANDER MC-GOWEN and FRANK T. McGOWEN, of Houston, in the county of Harris and State of Texas, have invented a new and useful Improvement in Cotton or Hay Presses, of which the following is a specification.

Our invention is an improvement in the class of presses whose followers are operated by a screw-shaft and worm-gear.

The novel features constituting our improvements are as hereinafter described and claimed.

In the accompanying drawings, Figure 1 is a vertical central section of the portion of press embodying our invention. Fig. 2 is a horizontal section on line $x\ x$, Fig. 1. Fig. 3 is a front perspective view of the lower portion of a press to which our invention is applied. Fig. 4 is an end view of one of the adjustable bearings of the worm-shaft.

The head of screw-shaft A is bolted to the follower B, which works in the vertical pressbox C. The follower is worked up and down by means of a rotary worm-wheel, D, whose elongated hub is threaded internally corresponding to the screw A, and thereby also converted into a nut. This combined worm-wheel and nut sustains the weight of the screw and follower and the load imposed on the latter in the act of pressing. To relieve friction between it and the circular base-plate E, a bearing is provided by steel or other hardened metal balls F, which are placed and travel in annular coincident grooves $a\ a'$, formed, respectively, in the contiguous surfaces of the worm-wheel D and base-plate E. The edge of the latter is reduced in thickness, and bolts $b$ pass through it to secure the plate to the base-timbers G, through which the screw A works, as shown.

The combined worm-wheel and nut D is rotated by a worm, H, which engages its toothed periphery and is fixed on or forms an integral part of a horizontal shaft, H'. The latter has its bearings in boxes consisting of a cap, $c$, and base $d$, which are secured adjustably to the support I by means of bolts $e$. This support is an iron frame or plate having a portion cut out to adapt it to surround the baseplate E, so that it rests on the ledge formed by the reduced portion of the latter, and to which it is secured by the same bolts, $b$, that attach the base-plate to the timbers G, as before described. The bearings $c\ d$ of worm, shaft H' rest on the portion of this frame I which projects laterally, as shown. To provide for the adjustment of the bearings, which is required to take up wear between the worm H and wheel D, we construct the frame I with slots $f$ for the bolts $e$, and with a flange, $g$, through which pass the screws $h$, whose inner ends bear against the boxes $c\ d$, as shown. By first loosening the nuts of bolts $e$ it is apparent the boxes may be quickly adjusted by turning the screws $h$, so as to bring the worm H into the closest contact possible with the wheel D.

The worm-shaft H' is provided with pulleys, as shown, so that power may be applied from any suitable motor by means of belts.

What we claim is—

1. In a press of the type hereinbefore indicated, the combination, with the followerscrew, the worm H and worm-shaft H', the combined worm-gear and nut, and the baseplate E, having a peripheral ledge, as specified, of the plate I, having bearings for said worm-shaft and an annular portion which encircles said base-plate, and the bolts $b\ b$, which pass through both such annular portion and base-plate for securing them together and to the base-timbers of the press, as shown and described.

2. In a press of the type hereinbefore indicated, the combination, with the followerscrew and combined worm-wheel and nut D, having the elongated hub, and the shaft H', having worm H, of the laterally - extended frame I, having a portion secured beneath the aforesaid nut and provided with slots $f$, and the vertical flange $g$ of the adjustable shaft, boxes $c\ d$, the bolts $e$, having nuts, as specified, and passing through the latter and said slots $f$, and the adjusting-screws $h$, working in said flange, all as shown and described, for the purpose specified.

ALLEXANDER McGOWEN.
FRANK T. McGOWEN.

Witnesses:
G. C. FELTON,
O. H. THOMSON.